(12) United States Patent
Nguyen et al.

(10) Patent No.: US 10,233,381 B2
(45) Date of Patent: *Mar. 19, 2019

(54) METHODS AND COMPOSITIONS FOR STABILIZING FRACTURE FACES DURING HYDRAULIC FRACTURING TREATMENTS

(71) Applicant: HALLIBURTON ENERGY SERVICES, INC., Houston, TX (US)

(72) Inventors: Philip D. Nguyen, Houston, TX (US); Shoy G. Chittattukara, Thrissur (IN); Prajakta R. Patil, Pune (IN); Vijay Patnana, Madhurawada (IN); Anjali R. Sarda-Mantri, Pune (IN); Sumit S. Konale, Solapur (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/534,423

(22) PCT Filed: Jan. 20, 2015

(86) PCT No.: PCT/US2015/011979
§ 371 (c)(1),
(2) Date: Jun. 8, 2017

(87) PCT Pub. No.: WO2016/118110
PCT Pub. Date: Jul. 28, 2016

(65) Prior Publication Data
US 2017/0335170 A1 Nov. 23, 2017

(51) Int. Cl.
*E21B 33/138* (2006.01)
*C09K 8/575* (2006.01)
(Continued)

(52) U.S. Cl.
CPC .......... *C09K 8/5755* (2013.01); *C09K 8/5086* (2013.01); *C09K 8/84* (2013.01); *E21B 33/138* (2013.01); *E21B 43/267* (2013.01)

(58) Field of Classification Search
None
See application file for complete search history.

(56) References Cited

U.S. PATENT DOCUMENTS 3,646,999 A * 3/1972 Hamby, Jr. ............... C09K 8/50
166/281
4,787,453 A * 11/1988 Hewgill ................. C09K 8/575
106/900

(Continued)

FOREIGN PATENT DOCUMENTS

WO 2009/085377 8/2000
WO 2014/126805 10/2013

OTHER PUBLICATIONS

PCT International Search Report and Written Opinion, dated Oct. 12, 2015, Appl No. PCT/US2015/011979, "Methods and Compositions for Stabilizing Fracture Faces During Hydraulic Fracturing Treatments", filed Jan. 20, 2015.

*Primary Examiner* — Andrew Sue-Ako
(74) *Attorney, Agent, or Firm* — Thomas Rooney; C. Tumey Law Group PLLC

(57) ABSTRACT

A method of treating a subterranean formation including introducing a preflush solution comprising a first aqueous base fluid and a surfactant onto the face of a fracture in a subterranean formation with particulates in the fracture; introducing a stabilizing composition onto the fracture face of the formation and onto the particulates proximate the fracture face, the composition including a second aqueous-based fluid; a silane-based resin; and a silane-based curing agent; allowing the stabilizing composition to consolidate the particulates proximate the fracture face, thereby stabilizing the fracture face and proximate particulates in the fracture. A method includes introducing a conformance treatment fluid into at least a portion of a subterranean formation, said treatment fluid including: an aqueous-based fluid; a silane-based resin; and a silane-based curing agent; and allowing the conformance treatment fluid to at least partially seal the pores of the formation.

12 Claims, 2 Drawing Sheets

(51) Int. Cl.
  *C09K 8/508* (2006.01)
  *C09K 8/84* (2006.01)
  *E21B 43/267* (2006.01)

(56) References Cited

U.S. PATENT DOCUMENTS

| | | |
|---|---|---|
| 5,960,880 A | 10/1999 | Nguyen et al. |
| 6,045,873 A | 4/2000 | Adachi et al. |
| 7,037,958 B1 | 5/2006 | Hansen et al. |
| 7,114,570 B2 | 10/2006 | Nguyen et al. |
| 7,264,052 B2 | 9/2007 | Nguyen et al. |
| 7,267,171 B2 | 9/2007 | Dusterhoft et al. |
| 7,343,973 B2 | 3/2008 | Dusterhoft et al. |
| 9,644,135 B2 * | 5/2017 | Sarda-Mantri ....... C09K 8/5751 |
| 2010/0147515 A1 | 6/2010 | Hughes et al. |
| 2011/0152134 A1 | 6/2011 | Nitschke et al. |
| 2011/0220360 A1 * | 9/2011 | Lindvig .................. C09K 8/40 166/305.1 |
| 2012/0205107 A1 | 8/2012 | Rickman et al. |
| 2013/0052355 A1 | 2/2013 | Hachikian et al. |
| 2014/0190697 A1 * | 7/2014 | Tang ....................... C09K 8/565 166/295 |
| 2014/0311743 A1 | 10/2014 | Vo et al. |

\* cited by examiner

METHODS AND COMPOSITIONS FOR STABILIZING FRACTURE FACES DURING HYDRAULIC FRACTURING TREATMENTS

BACKGROUND

Many petroleum-containing formations also contain unconsolidated granular mineral material such as sand or gravel. After completion, production of fluids from the formation causes the flow of the particulate matter into the wellbore, which often leads to any of several difficult and expensive problems. Unconsolidated subterranean zones include those which contain loose particulates that are readily entrained by produced fluids and those wherein the particulates making up the zone are bonded together with insufficient bond strength to withstand the forces produced by the production of fluids through the zone. The unconsolidated particulates may be naturally occurring, placed during an operation, or created during an operation. As used herein, the term "unconsolidated particulates" refers to any loose or loosely bonded particulates that may move through the formation with wellbore fluids (e.g., production fluids). Unconsolidated particulates may include, for example, sand, gravel, proppant particulates, and/or formation fines.

Sometimes a well is said to "sand up", meaning the lower portion of the production well becomes filled with sand, after which further production of fluid from the formation becomes difficult or impossible. In other instances, sand production along with the fluid results in passage of granular mineral material into the pump and associated hardware of the producing well, which causes accelerated wear of the mechanical components of the producing oil well. Sustained production of sand sometimes forms a cavity in the formation which collapses and destroys the well.

Conventional treatment methods involve treating the porous, unconsolidated mass sand around the wellbore in order to cement the loose sand grains together, thereby forming a permeable consolidated sand mass which will allow production of fluids but which will restrain the movement of sand particles into the wellbore. These procedures create a permeable barrier or sieve adjacent to the perforations or other openings in the well casing which establish communication between the production formation and the production tubing, which restrains the flow of loose particulate mineral matter such as sand.

Oil or gas residing in the subterranean formation may be recovered by driving the fluid into the well using, for example, a pressure gradient that exists between the formation and the wellbore, the force of gravity, displacement of the fluid using a pump or the force of another fluid injected into the well or an adjacent well. The production of the fluid in the formation may be increased by hydraulically fracturing the formation. To accomplish this, a viscous fracturing fluid may pumped down the casing to the formation at a rate and a pressure sufficient to form fractures that extend into the formation, providing additional pathways through which the oil or gas can flow to the well. A proppant is a solid material, typically treated sand or man-made ceramic materials, designed to keep an induced hydraulic fracture open, during or following a fracturing treatment. It is added to the fracturing fluid. After the fracturing procedure has been completed, it may be desirable to consolidate the proppant materials.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

Figure 1:
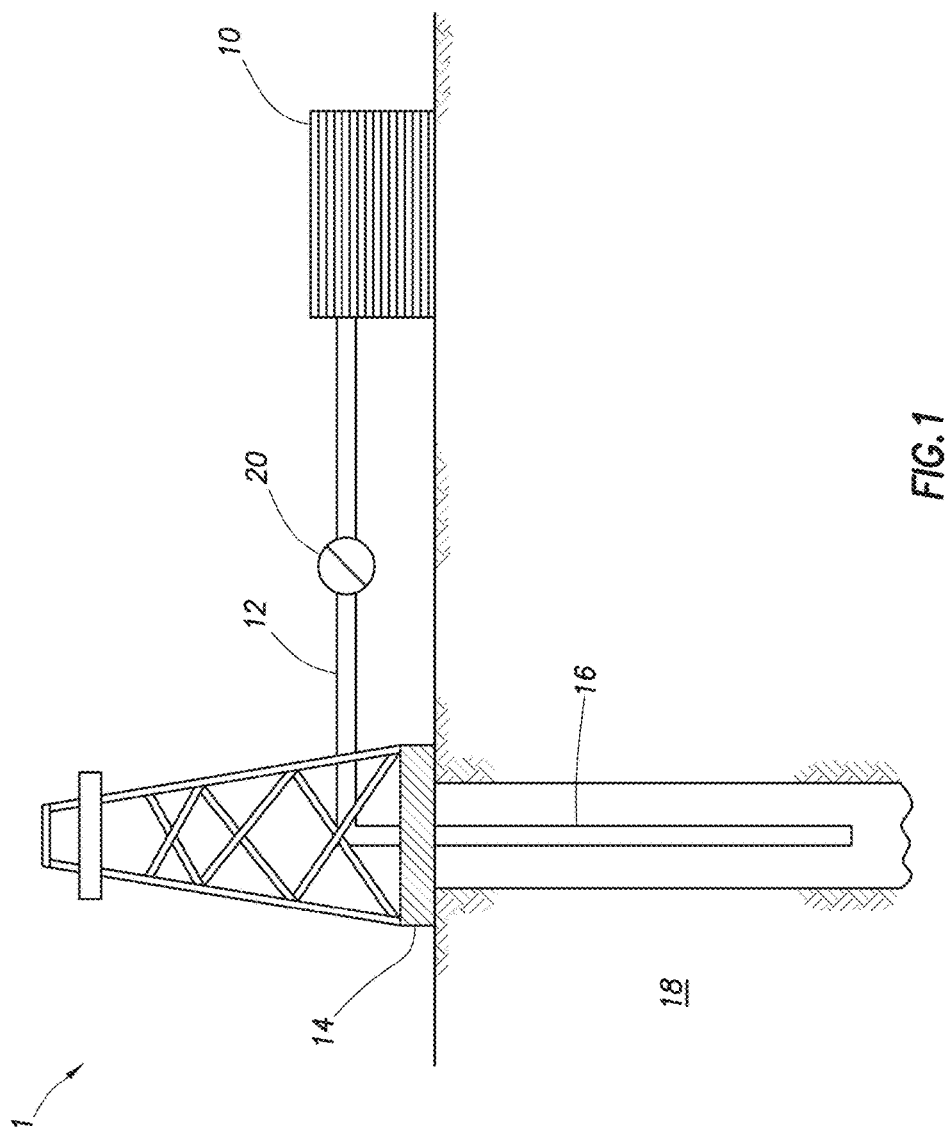
FIG. 1 depicts an embodiment of a system configured for delivering the consolidating agent composition comprising treatment fluids of the embodiments described herein to a downhole location.

The embodiments of this disclosure generally provide methods and compositions for stabilizing the fracture faces of the fractures that are being created by a hydraulic fracturing or frac-packing treatment, thus allowing the fracture faces and their adjacent formations to hold the formation particulates in place. These embodiments may minimize the invasion of formation particulates into the proppant pack, minimize the impact of proppant embedment into the fracture faces, and maintain the propped fracture conductivity.

The invention addresses some of the problems with traditional, amine cured resins. Those resin systems failed to achieve deeper penetration due to high viscosity and premature curing. The major cause behind the premature curing resin systems is the immediate temperature sensitive crosslinking reaction between epoxy and amine groups. Embodiments of the invention disclose a chemical compound that may replace amines and may assist in crosslinking the epoxy groups. Additionally, the newly identified compound has a delayed curing time that will help in achieving deeper penetration by preventing premature curing while pumping. Other disadvantages of former consolidation systems include: they are mostly solvent-based (i.e., using low flashpoint solvents such as short chain alcohols). If it is an aqueous-based system, the resin component is emulsified forming emulsion droplets. These droplets have particle sizes which tend to limit the penetration treatment into the formation matrix.

Although some embodiments described herein are illustrated by reference to hydraulic stimulation treatments, the consolidation compositions disclosed herein may be used in any subterranean formation operation that may benefit from consolidation of particulates. Such treatment operations may include, but are not limited to, a drilling operation; a stimulation operation; an acid-fracturing operation; a sand control operation; a completion operation; a scale inhibiting operation; a water-blocking operation such as a conformance treatment; a clay stabilizer operation; a fracturing operation; a frac-packing operation; a gravel packing operation; a wellbore strengthening operation; a sag control operation; a remedial operation; a near-wellbore consolidation operation; a plug and abandonment operation; and any combination thereof. By way of example, many consolidating treatments are performed at matrix flow rates. As used herein, the term "matrix flow rates" refers to a fluid rate such that the pressure exerted on the formation is less than that formation's fracturing pressure.

In certain embodiments of the present invention, a method comprises introducing a preflush solution comprising a first aqueous base fluid and a surfactant onto the face of a fracture in a subterranean formation with particulates in the fracture; introducing a stabilizing composition onto the fracture face of the formation and onto the particulates proximate the fracture face, the composition including a second aqueous-based fluid; a silane-based resin; and a silane-based curing agent; allowing the stabilizing composition to consolidate the particulates proximate the fracture face, thereby stabilizing the fracture face and proximate particulates in the fracture. The silane-based resin may include at least one epoxy-functionalized alkoxysilane selected from the group consisting of: (3-glycidoxypropyl)trimethoxysilane, (3-glycidoxypropyl)triethoxysilane, 5,6-epoxyhexyltriethoxysilane, (3-glycidoxypropyl)methyldiethoxysilane, (3-glycidoxypropyl)methyldimethoxysilane, (3-glycidoxypropyl)dimethylethoxysilane, and combinations thereof. In another embodiment, the silane-based curing agent is a silane-based amine curing agent. In an exemplary embodiment, the silane-based amine curing agent may be at least one selected from the group consisting of N-[3-(trimethoxysilyl)propyl]ethylenediamine; 3-aminopropyltriethoxysilane; 3-aminopropyltrimethoxysilane; 4-aminobutyltriethoxysilane; aminophenyltrimethoxysilane; 3-aminopropyltris(methoxyethoxy-ethoxy)silane; 11-aminodecyltriethoxysilane; 2-(4-pyridylethyl)triethoxysilane; 3-aminopropyl diisopropylethoxysilane; 3-aminopropyl dimethylethoxysilane; N-(2-aminoethyl)-3-aminopropyl-triethoxysilane; N-(6-aminohexyl)aminomethyl-triethoxysilane; N-(6-aminohexyl)aminopropyl-trimethoxysilane; (3-trimethoxysilylpropyl)diethylene triamine; N-butylaminopropyltrimethoxysilane; bis(2-hydroxyethyl)-3-aminopropyl-triethoxysilane; 3-(N-styrylmethyl-2-aminoethylamino)propyltrimethoxysilane hydrochloride; and combinations thereof. In another embodiment, the silane-based curing agent is not amine based. In an exemplary embodiment, the non-amine based curing agent may be at least one selected from the group consisting of 3-(trimethoxysilyl)propylsuccinic anhydride; 3-(triethoxysilyl)propylsuccinic anhydride, 3-(methyldimethoxysilyl)propylsuccinic anhydride; 3-(methyldiethoxysilyl)propylsuccinic anhydride; and combinations thereof. In certain embodiments, the silane-based resin may be present in the stabilizing composition in an amount of from about 0.1 v/v % to about 20 v/v % by volume of the second aqueous-based fluid, wherein the percentages are by volume of the component to volume of the aqueous based fluid, that is "v/v %." In some embodiments, the silane-based curing agent may be present in the stabilizing composition in an amount of from about 0.05 v/v % to about 5 v/v % by volume of the second aqueous-based fluid. In exemplary embodiments, the stabilizing composition further comprises a delaying agent. In an additional embodiment, the method further comprises introducing a postflush solution including a third aqueous-base fluid and an alkaline agent.

Certain embodiments of the present invention provide a method comprising introducing a conformance treatment fluid into at least a portion of a subterranean formation, said treatment fluid comprising: an aqueous-based fluid; a silane-based resin; and a silane-based curing agent; allowing the conformance treatment fluid to at least partially seal the pores of the formation. The silane-based resin may include at least one epoxy-functionalized alkoxysilane selected from the group consisting of: (3-glycidoxypropyl)trimethoxysilane, (3-glycidoxypropyl)triethoxysilane, 5,6-epoxyhexyl-triethoxysilane, (3-glycidoxypropyl)methyldiethoxysilane, (3-glycidoxypropyl)methyldimethoxysilane, (3-glycidoxypropyl)dimethylethoxysilane, and combinations thereof. In another embodiment, the silane-based curing agent is a silane-based amine curing agent. In an exemplary embodiment, the silane-based amine curing agent may be at least one selected from the group consisting of N-[3-(trimethoxysilyl)propyl]ethylenediamine; 3-aminopropyltriethoxysilane; 3-aminopropyltrimethoxysilane; 4-aminobutyltriethoxysilane; aminophenyltrimethoxysilane; 3-aminopropyltris(methoxy-ethoxy)silane; 11-aminodecyltriethoxysilane; 2-(4-pyridylethyl)triethoxysilane; 3-aminopropyl diisopropylethoxysilane; 3-aminopropyl dimethylethoxysilane; N-(2-aminoethyl)-3-aminopropyl-triethoxysilane; N-(6-aminohexyl)aminomethyl-triethoxysilane; N-(6-aminohexyl)aminopropyl-trimethoxysilane; (3-trimethoxysilylpropyl)diethylene triamine; N-butylaminopropyltrimethoxysilane; bis(2-hydroxyethyl)-3-aminopropyl-triethoxysilane; 3-(N-styrylmethyl-2-aminoethylamino)propyltrimethoxysilane hydrochloride; and combinations thereof. In an embodiment, the silane-based curing agent is not amine based. In an exemplary embodiment, the non-amine based curing agent may be at least one selected from the group consisting of 3-(trimethoxysilyl)propylsuccinic anhydride; 3-(triethoxysilyl)propylsuccinic anhydride, 3-(methyldimethoxysilyl)propylsuccinic anhydride; 3-(methyldiethoxysilyl)propylsuccinic anhydride; and combinations thereof. In certain embodiments, the silane-based resin may be present in the conformance treatment fluid in an amount of from about 0.1 v/v % to about 20 v/v % by volume of the aqueous-based fluid. In some embodiments, the silane-based curing agent may be present in the conformance treatment fluid in an amount of from about 0.05 v/v % to about 5 v/v % by volume of the aqueous-based fluid.

In certain embodiments of the present invention, a method comprises introducing a preflush solution comprising a first aqueous base fluid and a surfactant into at least a portion of a subterranean formation with particulates in a fracture; introducing a consolidation composition into the portion of the formation, said composition comprising: a second aqueous-based fluid; a silane-based resin; and a silane-based curing agent; and allowing the consolidation composition to at least partially consolidate the particulates in the fracture. The silane-based resin may include at least one epoxy-functionalized alkoxysilane selected from the group consisting of: (3-glycidoxypropyl)trimethoxysilane, (3-glycidoxypropyl)triethoxysilane, 5,6-epoxyhexyltriethoxysilane, (3-glycidoxypropyl)methyldiethoxysilane, (3-glycidoxypropyl)methyldimethoxysilane, (3-glycidoxypropyl)dimethylethoxysilane, and combinations thereof. In another embodiment, the silane-based curing agent is a silane-based amine curing agent. In an exemplary embodiment, the silane-based amine curing agent may be at least one selected from the group consisting of N-[3-(trimethoxysilyl)propyl]ethylenediamine; 3-aminopropyltriethoxysilane; 3-aminopropyltrimethoxysilane; 4-aminobutyltriethoxysilane; aminophenyltrimethoxysilane; 3-aminopropyltris(methoxyethoxy-ethoxy)silane; 11-aminodecyltriethoxysilane; 2-(4-pyridylethyl)triethoxysilane; 3-aminopropyl diisopropylethoxysilane; 3-aminopropyl dimethylethoxysilane; N-(2-aminoethyl)-3-aminopropyl-triethoxysilane; N-(6-aminohexyl)aminomethyl-triethoxysilane; N-(6-aminohexyl)aminopropyl-trimethoxysilane; (3-trimethoxysilylpropyl)diethylene triamine; N-butylaminopropyltrimethoxysilane; bis(2-hydroxyethyl)-3-aminopropyl-triethoxysilane; 3-(N-styrylmethyl-2-aminoethylamino)propyltrimethoxysilane hydrochloride; and combinations thereof. In another embodiment, the silane-based curing agent is not amine based. In an exemplary embodiment, the non-amine based curing agent may be at least one selected from the group consisting of 3-(trimethoxysilyl)propylsuccinic anhydride; 3-(triethoxysilyl)propylsuccinic anhydride, 3-(methyldimethoxysilyl)propylsuccinic anhydride;

3-(methyldiethoxysilyl)propylsuccinic anhydride; and combinations thereof. In certain embodiments, the silane-based resin may be present in the consolidation composition in an amount of from about 0.1 v/v % to about 20 v/v % by volume of the second aqueous-based fluid, wherein the percentages are by volume of the component to volume of the aqueous based fluid, that is "v/v %." In some embodiments, the silane-based curing agent may be present in the consolidation composition in an amount of from 0.05 v/v % to about 5 v/v % by volume of the second aqueous-based fluid. In some embodiments, the clay content in the formation is at least about 5%. In other embodiments, the clay content in the formation is at least about 10%.

Another embodiment of the invention includes a system for treating a subterranean formation comprising: an apparatus, including a mixer and a pump, configured to: introduce a preflush solution comprising a first aqueous base fluid and a surfactant into at least a portion of the subterranean formation with particulates in at least one fracture; introduce a consolidation composition into the portion of the formation, said composition comprising: a second aqueous-based fluid; a silane-based resin; and a silane-based curing agent; and allow the consolidation composition to at least partially consolidate the particulates in the at least one fracture.

Aqueous Base Fluids

The aqueous base fluid of the present embodiments can generally be from any source, provided that the fluids do not contain components that might adversely affect the stability and/or performance of the treatment fluids of the present invention. In various embodiments, the aqueous carrier fluid can comprise fresh water, salt water, seawater, brine, or an aqueous salt solution. In some embodiments, the aqueous carrier fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like.

Aqueous base fluids may be used as the base for a preflush fluid, a postflush fluid, or a treatment fluid containing one or more components of the two-component consolidation composition. In some preferred embodiments the aqueous fluid contains a salt such as sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate, and any combination thereof.

In some embodiments where portions of a formation are to be consolidated, first a preflush is placed into the portion of the formation to prepare for the consolidating treatment. Preferably, the preflush comprises a surfactant to remove debris, and/or oil residue and the preflush may further comprise a clay stabilizer in formations where clay swelling or movement is of concern. Next, the two component resin system is placed into the portion of the subterranean formation to coat the surfaces therein. Finally, an aqueous postflush solution may be placed into the area where the two component resin system was placed. Postflush fluids may be used as simple aqueous fluids to clean the interstitial spaces or may serve multiple purposes by including an optional clay stabilizer and/or an optional alkaline agent to accelerate the curing of certain silane-based resins.

Stabilizing/Consolidation Compositions

The stabilizing/consolidation compositions described herein may comprise a silane-based resin, an aqueous liquid, and a silane-based curing agent. For the embodiments of the invention, both the silicon on the silane-based resin and the silicon on the silane-based curing agent may act to aid in securing the resin to sand surfaces on a proppant or formation fines and surfaces. The stabilizing/consolidation compositions described herein may cure to form a cohesive, flexible, and potentially permeable mass that immobilizes particulates (e.g., proppant particulates and/or unconsolidated particulates).

Silane-Based Resins

In several embodiments, the silane-based resins comprise a compound containing an epoxy group and a silicon atom having at least one direct oxygen attachment. Exemplary embodiments of suitable silane-based resins are epoxy-functionalized alkoxysilanes that include at least one of the following: (3-glycidoxypropyl)trimethoxysilane, (3-glycidoxypropyl)triethoxysilane, 5,6-epoxyhexyltriethoxysilane, (3-glycidoxypropyl)methyldiethoxysilane, (3-glycidoxypropyl)methyldimethoxysilane, (3-glycidoxypropyl)dimethylethoxysilane, and combinations thereof.

Derivatives of the above may also be used in various embodiments. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds. In some embodiments, the silane-based resin may be present in the aqueous treatment fluid in a range of from a lower limit of about 0.1%, to an upper limit of about 20% by weight of the aqueous treatment fluid.

Silane-Based Curing Agents

Embodiments of the invention include silane-based curing agents. These curing agents may or may not contain compounds with reactive amine groups. In exemplary embodiments, the silane-based amine curing agents may include at least one of N-[3-(trimethoxysilyl)propyl]ethylenediamine; 3-aminopropyltriethoxysilane; 3-aminopropyltrimethoxysilane; 4-aminobutyltriethoxysilane; aminophenyltrimethoxysilane; 3-aminopropyltris(methoxyethoxyethoxy)silane; 11-aminodecyltriethoxysilane; 2-(4-pyridylethyl)triethoxysilane; 3-aminopropyl diisopropylethoxysilane; 3-aminopropyl dimethylethoxysilane; N-(2-aminoethyl)-3-aminopropyl-triethoxysilane; N-(6-aminohexyl)aminomethyl-triethoxysilane; N-(6-aminohexyl)aminopropyl-trimethoxysilane; (3-trimethoxysilylpropyl)diethylene triamine; N-butylaminopropyltrimethoxysilane; bis(2-hydroxyethyl)-3-aminopropyl-triethoxysilane; 3-(N-styrylmethyl-2-aminoethylamino) propyltrimethoxysilane hydrochloride; and combinations thereof. Derivatives of the above may also be utilized. The advantages of this silane-based amine curing agent when used with a silane-based resin may include at least one of: being environmentally friendly in part due to a water based system, having the ability to stabilize fracture faces and their adjacent formations, having the ability to mitigate movements of fines into a proppant pack, having low viscosity similar to that of water without including emulsion droplets or particulates; having the ability to extend the life of a proppant pack without damaging its permeability; being able to be pumped in a wide range of formations, including those with permeability as low as about 10 mD.

Certain embodiments of the invention include silane-based curing agents without amine groups. In an embodiment, 3-(trimethoxysilyl)propylsuccinic anhydride may be utilized. This agent contains a highly-reactive acid anhydride group that allows this silane to be grafted onto organic resins containing active hydrogens, such as the epoxy-functionalized alkoxysilanes mentioned above. In exemplary embodiments, these silane-based curing agents may include at least one of 3-(trimethoxysilyl)propylsuccinic anhydride; 3-(triethoxysilyl)propylsuccinic anhydride, 3-(methyldimethoxysilyl)propylsuccinic anhydride; 3-(methyldiethoxysilyl)propylsuccinic anhydride; and combinations thereof. Derivatives of the above may also be utilized. The advantages of this type of curing agent when used with a silane-based resin may include at least one of: eliminating the premature curing of amine based curing systems, removing the requirement of post flush solvents, removing the need for additional delaying agents to control curing times, being environmentally friendly in part due to a water based system, being effective in formations with no clay content or with high clay content (at least about 5%), being able to be pumped in a wide range of permeability formations (from about 30 mD to about 1300 mD). In some embodiments, resins cured using the non-amine silane-based curing agents may be used even if the clay content is at least about 10%. The slow reacting time of the non-amine based system does not require the use of a delaying agent.

In some embodiments the non-amine silane-based curing agents listed above may be used in conformance applications along with silane-based resins. The advantages may include at least one of: environmental friendliness in part due to a water based system, ability to form a very hard, fairly impermeable seal, stability at high temperatures and pressures, achievement of deeper penetration. In certain embodiments, increasing the silane-based resin concentration to an amount in the range of about 10% to about 40% v/v % may result in very hard and impermeable structures. Treatments using higher silane-based concentrations and without treatment postflush solution may allow the resin to occupy and solidify within the pore spaces between grains, thus drastically reducing the flow permeability of the formation.

In some embodiments, the silane-based curing agents, either with or without reactive amine groups, may be present in the range of from a lower limit of about 0.05%, to an upper limit of about 5% by weight of the aqueous treatment fluid.

Delaying Agents

In some embodiments where silane-base amine curing agents are used, delaying agents capable of temporarily protecting the amine to delay curing include organic acids (i.e., formic acid, acetic acid), inorganic acids (i.e., HCl), trimethylchlorosilane, dimethyldichlorosilane, methyltrichlorosilane, and combinations thereof. Derivatives of the above may also be suitable. The delaying agents may be delivered at the same time as the curing agents, or may be added in a postflush treatment, which also includes an aqueous base fluid. A postflush treatment may also be used to reverse the protection reaction. The protection reaction may be reversed with the addition of heat in the presence of an alkaline fluid to produce hydrolysis. Alkaline agents suitable for use in the invention to make the amine site on the silane-based amine curing agent available to cure the silane-based resin include sodium bicarbonate, sodium hydroxide, or combinations thereof. Where used, the alkaline agents are generally present in an aqueous based fluid in an amount of from about 0.1% to about 5% by weight of the aqueous based fluid. In some embodiments, the delaying agent may be present in the range of from a lower limit of about 0.04%, to an upper limit of about 2% by weight of the aqueous treatment fluid. These delaying agents are not needed if non-amine silane-base curing agents are utilized.

Surfactants

In some embodiments, the consolidation compounds may further comprise a surfactant. A surfactant may be used in the consolidation compositions described herein to facilitate coating of the consolidation composition onto a suitable substrate (e.g., proppant particulates and/or unconsolidated particulates). Any surfactant compatible with the consolidation compositions described herein may be used. Suitable surfactants may include, but are not limited to, an alkyl phosphonate surfactant (e.g., a $C_{12}$-$C_{22}$ alkyl phosphonate surfactant); an ethoxylated nonyl phenol phosphate ester; one or more cationic surfactants; and one or more nonionic surfactants; and any combination thereof. The surfactant or surfactants that may be used in the consolidation composition agent may be present in an amount in the range of a lower limit of about 1%, 1.5%, 2%, 2.5%, 3%, 3.5%, 4%, 4.5%, and 5% to an upper limit of about 10%, 9.5%, 9%, 8.5%, 8%, 7.5%, 7%, 6.5%, 6%, 5.5%, and 5% by weight of the consolidation composition.

Proppants

In some embodiments, the proppants may be an inert material, and may be sized (e.g., a suitable particle size distribution) based upon the characteristics of the void space to be placed in.

Materials suitable for proppant particulates may comprise any material comprising inorganic or plant-based materials suitable for use in subterranean operations. Suitable materials include, but are not limited to, sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. The mean proppant particulate size generally may range from about 2 mesh to about 400 mesh on the U.S. Sieve Series; however, in certain circumstances, other mean proppant particulate sizes may be desired and will be entirely suitable for practice of the embodiments disclosed herein. In particular embodiments, preferred mean proppant particulate size distribution ranges are one or more of 6/12, 8/16, 12/20, 16/30, 20/40, 30/50, 40/60, 40/70, or 50/70 mesh. It should be understood that the term "particulate," as used herein, includes all known shapes of materials, including substantially spherical materials; fibrous materials; polygonal materials (such as cubic materials); and any combination thereof. In certain embodiments, the particulates may be present in the first treatment fluids or single treatment fluids in an amount in the range of from an upper limit of about 30 pounds per gallon ("ppg"), 25 ppg, 20 ppg, 15 ppg, and 10 ppg to a lower limit of about 0.5 ppg, 1 ppg, 2 ppg, 4 ppg, 6 ppg, 8 ppg, and 10 ppg by volume of the polymerizable aqueous consolidation composition.

In some embodiments, the proppants are coated with uncrosslinked or crosslinked resin before they have been placed downhole. In other embodiments, the proppants are coated after they have been placed in the subterranean formation. In certain embodiments, the proppants are coated with resins before they have been placed in the formation. A curing agent is then added to initiate crosslinking of the coated monomers, thereby consolidating the proppants.

Other Additives

In addition to the foregoing materials, it can also be desirable, in some embodiments, for other components to be present in the treatment fluid. Such additional components can include, without limitation, particulate materials, fibrous materials, bridging agents, weighting agents, gravel, corrosion inhibitors, catalysts, clay control stabilizers, biocides, bactericides, friction reducers, gases, surfactants, solubilizers, salts, scale inhibitors, foaming agents, anti-foaming agents, iron control agents, and the like.

Treatments

The treatment fluids of the present invention may be prepared by any method suitable for a given application. For example, certain components of the treatment fluid of the present invention may be provided in a pre-blended powder or a dispersion of powder in a nonaqueous liquid, which may be combined with the aqueous base fluid at a subsequent time. After the preblended liquids and the aqueous base fluid have been combined curing agents and other suitable additives may be added prior to introduction into the wellbore. Those of ordinary skill in the art, with the benefit of this disclosure will be able to determine other suitable methods for the preparation of the treatments fluids of the present invention.

The methods of the present invention may be employed in any subterranean treatment where a viscoelastic treatment fluid may be used. Suitable subterranean treatments may include, but are not limited to, fracturing treatments, sand control treatments (e.g., gravel packing), and other suitable treatments where a treatment fluid of the present invention may be suitable.

In addition to the fracturing fluid, other fluids used in servicing a wellbore may also be lost to the subterranean formation while circulating the fluids in the wellbore. In particular, the fluids may enter the subterranean formation via lost circulation zones for example, depleted zones, zones of relatively low pressure, zones having naturally occurring fractures, weak zones having fracture gradients exceeded by the hydrostatic pressure of the drilling fluid, and so forth.

In an embodiment, the consolidation treatment fluid is placed into a wellbore as a single stream and activated by downhole conditions to form a barrier that substantially seal lost circulation zones or other undesirable flowpaths.

In an embodiment, the consolidation treatment fluid may be introduced into the wellbore, the formation, or a lost circulation zone as a single pill fluid. That is, in such an embodiment, all components of the consolidation treatment fluid may be mixed and introduced into the wellbore as a single composition. In an alternative embodiment, the consolidation treatment fluid may be introduced into the wellbore, the formation, or the lost circulation zone sequentially in multiple components. As will be understood by those of ordinary skill in the art, it may be desirable or advantageous to introduce components of the consolidation treatment fluid separately and sequentially.

In still another exemplary embodiment, the separate introduction of at least two of the treatment fluid components may be achieved by introducing the components within a single flowpath, but being separated by a spacer. Such a spacer may comprise a highly viscous fluid which substantially or entirely prevents the intermingling of the consolidation treatment fluid components while being pumped into a wellbore. Such spacers and methods of using the same are generally known to those of ordinary skill in the art.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

As used herein, into a well means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

In various embodiments, systems configured for delivering the treatment fluids described herein to a downhole location are described. In various embodiments, the systems can comprise a pump fluidly coupled to a tubular, the tubular containing the resin consolidation compositions and/or the water-soluble curing compositions, and any additional additives, disclosed herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the embodiments disclosed herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Examples

The invention having been generally described, the following examples are given as particular embodiments of the invention and to demonstrate the practice and advantages hereof. It is understood that the examples are given by way of illustration and are not intended to limit the specification or the claims to follow in any manner.

Sand Pack Testing

The effectiveness of the newly identified system on sand consolidation was determined using the following experiment: A sand pack was prepared using the composition (48 g SSA-1™ agent+48 g 20/40 sand+4 g Bentonite). After preparing the sand pack, initial permeability was measured using 3% Brine and the treatment was performed using the concentrations in Table 1. The treatment fluid was prepared in 3% KCl. SSA-1™ agent is a cement additive also known as silica flour and is available from Halliburton Energy Services, Inc., Houston, Tex.

TABLE 1

| | Chemical | CAS No. | Concentration v/v % |
|---|---|---|---|
| 1 | 3-Glycidoxypropyl trimethoxysilane | 2530-83-8 | 3% |
| 2 | 3-(Trimethoxysilyl)propylsuccinic anhydride | 93642-68-3 | 2.112% |

After desired curing time, regain permeability and UCS values were measured to check the effectiveness of treatment. The results are shown in Table 2.

TABLE 2

| Temperature | Initial Perm | Regained Perm | UCS | Curing Temp | Curing Time |
|---|---|---|---|---|---|
| 150° F. | 105 mD | 92% | 312 psi | 250° F. | 5 days |

One of skill in the art will appreciate that the favorable regained permeability and UCS values may demonstrate the effectiveness of the treatment fluid in consolidation applications.

Conformance Evaluation

A treatment fluid with components listed in Table 3 was prepared in 3% KCl.

TABLE 3

| | Chemical | CAS No. | Concentration |
|---|---|---|---|
| 1 | 3-Glycidoxypropyl trimethoxysilane | 2530-83-8 | 10% |
| 2 | 3-(Trimethoxysilyl)propylsuccinic anhydride | 93642-68-3 | 5.28% |

Figure 2A:
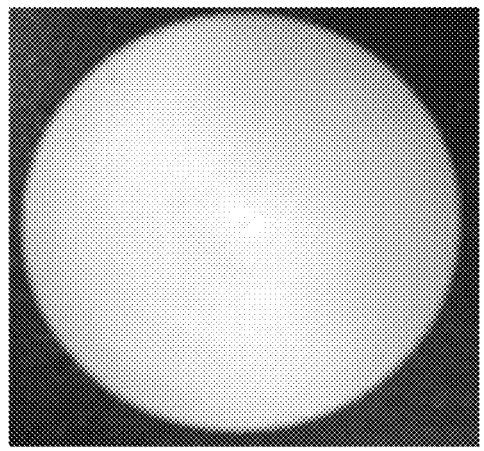
FIGS. 2A,B are photographs showing crosslinked proppant particulates after a conformance treatment according to embodiments described herein.
Figure 2B:
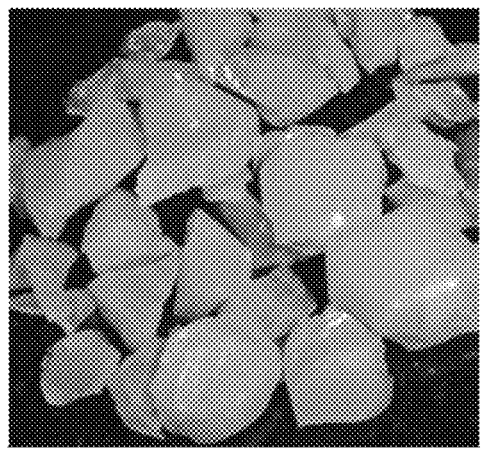

Basic test results indicate that the silanes after crosslinking form a silicon dioxide based matrix, and the structures resemble a crystalline solid. Being silica based network, the stability of the system is very high at bottom hole conditions. The curing time can be controlled by adjusting the ratio of silanes, allowing one to provide predictable and controllable pumping times at a given temperature. Photographs of the silane system after crosslinking demonstrate the structures before (FIG. 2A) and after (FIG. 2B) crushing. One of skill in the art will realize through visual observations that silanes after crosslinking may form a very hard and impermeable seal.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Embodiments disclosed herein include:

A: introducing a preflush solution comprising a first aqueous base fluid and a surfactant onto at least a portion of the face of a fracture in a subterranean formation with particulates in the fracture; introducing a stabilizing composition onto at least a portion of the fracture face of the formation and onto at least a portion of the particulates proximate the fracture face, said composition comprising: a second aqueous-based fluid; a silane-based resin; and a silane-based curing agent; and allowing the stabilizing composition to at least partially consolidate the particulates proximate the fracture face, thereby stabilizing at least a portion of fracture face and at least a portion of proximate particulates in the fracture.

B: A method comprising: introducing a conformance treatment fluid into at least a portion of a subterranean formation, said treatment fluid comprising: an aqueous-based fluid; a silane-based resin; and a silane-based curing agent; allowing the conformance treatment fluid to at least partially seal the pores of the formation.

C: introducing a preflush solution comprising a first aqueous base fluid and a surfactant into at least a portion of a subterranean formation with particulates in a fracture; introducing a consolidation composition into the portion of the formation, said composition comprising: a second aqueous-based fluid; a silane-based resin; and a silane-based curing agent; and allowing the consolidation composition to at least partially consolidate the particulates in the fracture.

D: A system for treating a subterranean formation comprising: an apparatus, including a mixer and a pump, configured to: introduce a preflush solution comprising a first aqueous base fluid and a surfactant into at least a portion of the subterranean formation with particulates in at least one fracture; introduce a consolidation composition into the portion of the formation, said composition comprising: a second aqueous-based fluid; a silane-based resin; and a silane-based curing agent; and allow the consolidation composition to at least partially consolidate the particulates in the at least one fracture.

Each of embodiments A, B, C and D may have one or more of the following additional elements in any combination: Element 1: wherein the silane-based resin is at least one epoxy-functionalized alkoxysilane selected from the group consisting of: (3-glycidoxypropyl)trimethoxysilane, (3-glycidoxypropyl)triethoxysilane, 5,6-epoxyhexyltriethoxysilane, (3-glycidoxypropyl)methyldiethoxysilane, (3-glycidoxypropyl)methyldimethoxysilane, (3-glycidoxypropyl)dimethylethoxysilane, and combinations thereof. Element 2: wherein the silane-based curing agent is a silane-based amine curing agent. Element 3: wherein the silane-based amine curing agent is at least one selected from the group consisting of N-[3-(trimethoxysilyl)propyl]ethylenediamine; 3-aminopropyltriethoxysilane; 3-aminopropyltrimethoxysilane; 4-aminobutyltriethoxysilane; aminophenyltrimethoxysilane; 3-aminopropyltris(methoxyethoxyethoxy)silane; 11-aminodecyltriethoxysilane; 2-(4-pyridylethyl)triethoxysilane; 3-aminopropyl diisopropylethoxysilane; 3-aminopropyl dimethylethoxysilane; N-(2-aminoethyl)-3-aminopropyl-triethoxysilane; N-(6-aminohexyl)aminomethyl-triethoxysilane; N-(6-aminohexyl)aminopropyl-trimethoxysilane; (3-trimethoxysilylpropyl)diethylene triamine; N-butylaminopropyltrimethoxysilane; bis(2-hydroxyethyl)-3-aminopropyl-triethoxysilane; 3-(N-styrylmethyl-2-aminoethylamino) propyltrimethoxysilane hydrochloride; and combinations thereof. Element 4: wherein the silane-based curing agent is not amine based. Element 5: wherein the silane-based curing agent is at least one selected from the group consisting of 3-(trimethoxysilyl)propylsuccinic anhydride; 3-(triethoxysilyl)propylsuccinic anhydride, 3-(methyldimethoxysilyl)propylsuccinic anhydride; 3-(methyldiethoxysilyl)propylsuccinic anhydride; and combinations thereof. Element 6: wherein the silane-based resin is present in the stabilizing composition in an amount of from about 0.1 v/v % to about 20 v/v % by volume of the second aqueous-based fluid. Element 7: wherein the silane-based curing agent is present in the stabilizing composition in an amount of from about 0.05 v/v % to about 5 v/v % by volume of the second aqueous-based fluid. Element 8: further comprising a delaying agent in the stabilizing composition. Element 9: further comprising introducing a postflush solution including a third aqueous-base fluid and an alkaline agent. Element 10: wherein the clay content in the formation is at least about 5%. Element 11: wherein the clay content in the formation is at least about 10%.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:
1. A method comprising:
introducing a preflush solution comprising a first aqueous base fluid and a surfactant onto at least a portion of a fracture face of a fracture in a subterranean formation with particulates in the fracture;
introducing a stabilizing composition onto at least a portion of the fracture face of the formation and onto at least a portion of the particulates proximate the fracture face, said composition comprising:
a second aqueous-based fluid;
a silane-based resin, wherein the silane-based resin comprises a compound containing an epoxy group and a silicon atom having at least one direct oxygen attachment;
a silane-based amine curing agent, wherein the stabilizing composition does not include emulsion droplets; and
a delaying agent selected from the group consisting of an organic acid, an inorganic acid, methyltrichlorosilane, dimethyldichlorosilane, trimethylchlorosilane, and combinations thereof, wherein the delaying agent is present in an amount of about 0.04% to about 2% by weight of the stabilizing composition, and wherein the delaying agent and the silane-based amine curing agent are reacted to form a protected silane-based amine curing agent;
introducing a postflush solution comprising a third aqueous-base fluid and an alkaline agent, wherein the alkaline agent is present in the postflush solution in an amount of about 0.1% to about 5% by weight of the postflush solution;
reacting the alkaline agent with the delaying agent to form a hydrolysis product comprising the silane-based amine curing agent; and
allowing the stabilizing composition to at least partially consolidate the particulates proximate the fracture face, thereby stabilizing at least a portion of the fracture face and at least a portion of proximate particulates in the fracture.

2. The method of claim 1, wherein the silane-based resin is at least one epoxy-functionalized alkoxysilane selected from the group consisting of: (3-glycidoxypropyl)trimethoxysilane, (3-glycidoxypropyl)triethoxysilane, 5,6-epoxyhexyltriethoxysilane, (3-glycidoxypropyl)methyldiethoxysilane, (3-glycidoxypropyl)methyldimethoxysilane, (3-glycidoxypropyl)dimethylethoxysilane, and combinations thereof.

3. The method of claim 1, wherein the silane-based amine curing agent is at least one selected from the group consisting of N-[3-(trimethoxysilyl)propyl]ethylenediamine; 3-aminopropyltriethoxysilane; 3-aminopropyltrimethoxysilane; 4-aminobutyltriethoxysilane; aminophenyltrimethoxysilane; 3-aminopropyltris(methoxyethoxy-ethoxy)silane; 11-aminodecyltriethoxysilane; 2-(4-pyridylethyl)triethoxysilane; 3-aminopropyl diisopropylethoxysilane; 3-aminopropyl dimethylethoxysilane; N-(2-aminoethyl)-3-aminopropyl-triethoxysilane; N-(6-aminohexyl)aminomethyl-triethoxysilane; N-(6-aminohexyl)aminopropyl-trimethoxysilane; (3-trimethoxysilylpropyl)diethylene triamine; N-butylaminopropyltrimethoxysilane; bis(2-hydroxyethyl)-3-aminopropyl-triethoxysilane; 3-(N-styrylmethyl-2-aminoethylamino)propyltrimethoxysilane hydrochloride; and combinations thereof.

4. The method of claim 1, wherein the silane-based resin is present in the stabilizing composition in an amount of from about 0.1 v/v % to about 20 v/v % by volume of the second aqueous-based fluid.

5. The method of claim 1, wherein the silane-based curing agent is present in the stabilizing composition in an amount of from about 0.05 v/v % to about 5 v/v % by volume of the second aqueous-based fluid.

6. The method of claim 1, wherein the silane-based curing agent is present in the stabilizing composition in an amount of from about 0.05 v/v % to about 5 v/v % by volume of the second aqueous-based fluid.

7. A method comprising:
introducing a preflush solution comprising a first aqueous base fluid and a surfactant into at least a portion of a subterranean formation with particulates in a fracture;
introducing a consolidation composition into the portion of the formation at a matrix flow rate, said composition comprising:
a second aqueous-based fluid;
a silane-based resin, wherein the silane-based rein comprises a compound containing an epoxy group and a silicon atom having at least one direct oxygen attachment;
a silane-based amine curing agent, wherein the consolidation composition does not include emulsion droplets; and
a delaying agent selected from the group consisting of an organic acid, an inorganic acid, methyltrichlorosilane, dimethyldichlorosilane, trimethylchlorosilane, and combinations thereof, wherein the delaying agent is present in an amount of about 0.04% to about 2% by weight of the stabilizing composition, and wherein the delaying agent and the silane-based amine curing agent are reacted to form a protected silane-based amine curing agent;
introducing a postflush solution comprising a third aqueous-base fluid and an alkaline agent, wherein the alkaline agent is present in the postflush solution in an amount of about 0.10% to about 5% by weight of the postflush solution;
reacting the alkaline agent with the delaying agent to form a hydrolysis product comprising the silane-based amine curing agent; and
allowing the consolidation composition to at least partially consolidate the particulates in the fracture.

8. The method of claim 7, wherein the silane-based resin is at least one epoxy-functionalized alkoxysilane selected from the group consisting of: (3-glycidoxypropyl)trimethoxysilane, (3-glycidoxypropyl)triethoxysilane, 5,6-epoxyhexyltriethoxysilane, (3-glycidoxypropyl)methyldiethoxysilane, (3-glycidoxypropyl)methyldimethoxysilane, (3-glycidoxypropyl)dimethylethoxysilane, and combinations thereof.

9. The method of claim 7, wherein the silane-based amine curing agent is at least one selected from the group consisting of N-[3-(trimethoxysilyl)propyl]ethylenediamine; 3-aminopropyltriethoxysilane; 3-aminopropyltrimethoxysilane; 4-aminobutyltriethoxysilane; aminophenyltrimethoxysilane; 3-aminopropyltris(methoxyethoxyethoxy)silane; 11-aminodecyltriethoxysilane; 2-(4-pyridylethyl)triethoxysilane; 3-aminopropyl diisopropylethoxysilane; 3-aminopropyl dimethylethoxysilane; N-(2-aminoethyl)-3-aminopropyl-triethoxysilane; N-(6-aminohexyl)aminomethyl-triethoxysilane; N-(6-aminohexyl)aminopropyl-trimethoxysilane; (3-trimethoxysilylpropyl)diethylene triamine; N-butylaminopropyltrimethoxysilane; bis(2-hydroxyethyl)-3-aminopropyl-triethoxysilane; 3-(N-styrylmethyl-2-aminoethylamino)propyltrimethoxysilane hydrochloride; and combinations thereof.

10. The method of claim 7, wherein the silane-based resin is present in the consolidation composition in an amount of from about 0.1 v/v % to about 20 v/v % by volume of the aqueous-based fluid.

11. A method comprising:
introducing a stabilizing composition onto at least a portion of a fracture face of a subterranean formation and onto at least a portion of particulates proximate to the fracture face, said stabilizing composition comprising:
an aqueous-based fluid;
a silane-based resin selected from the group consisting of (3-glycidoxypropyl)trimethoxysilane, (3-glycidoxypropyl)triethoxysilane, 5,6-epoxyhexyltriethoxysilane, (3-glycidoxypropyl)methyldiethoxysilane, (3-glycidoxypropyl)methyldimethoxysilane, (3-glycidoxypropyl)dimethylethoxysilane, and combinations thereof;
a silane-based amine curing agent selected from the group consisting of N-[3-(trimethoxysilyl)propyl] ethylenediamine; 3-aminopropyltriethoxysilane; 3-aminopropyltrimethoxysilane; 4-aminobutyltriethoxysilane; aminophenyltrimethoxysilane; 3-aminopropyltris(methoxyethoxy-ethoxy)silane; 11-aminodecyltriethoxysilane; 2-(4-pyridylethyl)triethoxysilane; 3-aminopropyl diisopropylethoxysilane; 3-aminopropyl dimethylethoxysilane; N-(2-aminoethyl)-3-aminopropyl-triethoxysilane; N-(6-aminohexyl)aminomethyl-triethoxysilane; N-(6-aminohexyl)aminopropyl-trimethoxysilane; (3-trimethoxysilylpropyl)diethylene triamine; N-butylaminopropyltrimethoxysilane; bis(2-hydroxyethyl)-3-aminopropyl-triethoxysilane; 3-(N-styrylmethyl-2-aminoethylamino)propyltrimethoxysilane hydrochloride; and combinations thereof, wherein the stabilizing composition does not include emulsion droplets; and
a delaying agent selected from the group consisting of an organic acid, an inorganic acid, methyltrichlorosilane, dimethyldichlorosilane, trimethylchlorosilane, and combinations thereof wherein the delaying agent is present in an amount of about 0.04% to about 2% by weight of the stabilizing composition, and wherein the delaying agent and the silane-based amine curing agent are reacted to form a protected silane-based amine curing agent;
introducing a postflush solution comprising a third aqueous-base fluid and an alkaline agent, wherein the alkaline agent is present in the postflush solution in an amount of about 0.1% to about 5% by weight of the postflush solution;

reacting the alkaline agent with the delaying agent to form a hydrolysis product comprising the silane-based amine curing agent; and allowing the stabilizing composition to at least partially consolidate the particulates proximate the fracture face, thereby stabilizing at least a portion of fracture face and at least a portion of proximate particulates in the fracture.

12. The method of claim 11, wherein the silane-based resin is present in the stabilizing composition in an amount of from about 0.1 v/v % to about 20 v/v % by volume of the aqueous-based fluid.

* * * * *